United States Patent
Dentler et al.

(10) Patent No.: US 6,641,064 B1
(45) Date of Patent: Nov. 4, 2003

(54) COMPLETE DRYING METHOD FOR HYDROGELS

(75) Inventors: Joachim Dentler, Bruchköbel (DE); Norbert Herfert, Altenstadt (DE); Helmut Klotzsche, Alzenau (DE); Rudolf Schliwa, Alzenau (DE); Uwe Stüven, Bad Soden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/807,447

(22) PCT Filed: Oct. 14, 1999

(86) PCT No.: PCT/EP99/07747

§ 371 (c)(1),
(2), (4) Date: Apr. 25, 2001

(87) PCT Pub. No.: WO00/24810

PCT Pub. Date: May 4, 2000

(30) Foreign Application Priority Data

Oct. 27, 1998 (DE) ......................................... 198 49 499

(51) Int. Cl.$^7$ ............................................... B02C 19/12
(52) U.S. Cl. ...................................... 241/24.28; 241/29
(58) Field of Search ................................ 241/24.28, 25, 241/29, 30, 80

(56) References Cited

U.S. PATENT DOCUMENTS

| | | | |
|---|---|---|---|
| 3,905,122 A | | 9/1975 | Ohshima et al. |
| 4,057,521 A | | 11/1977 | Gross |
| 4,062,817 A | | 12/1977 | Westerman |
| 4,076,663 A | | 2/1978 | Masuda et al. |
| 4,286,082 A | | 8/1981 | Tsubakimoto et al. |
| 4,295,987 A | | 10/1981 | Parks |
| 4,380,706 A | | 4/1983 | Wrathall |
| 4,525,527 A | | 6/1985 | Takeda et al. |
| 4,914,170 A | | 4/1990 | Chang et al. |
| 4,931,497 A | | 6/1990 | Engelhardt et al. |
| 5,011,892 A | | 4/1991 | Engelhardt et al. |
| 6,100,305 A | * | 8/2000 | Miyake et al. ................. 521/53 |

FOREIGN PATENT DOCUMENTS

| | | |
|---|---|---|
| EP | 0 497 623 | 8/1992 |
| EP | 0 508 810 | 10/1992 |
| EP | 0 811 636 | 12/1997 |
| EP | 0 948 997 | 10/1999 |

* cited by examiner

*Primary Examiner*—Mark Rosenbaum
(74) *Attorney, Agent, or Firm*—Oblon, Spivak, McClelland, Maier & Neustadt, P.C.

(57) ABSTRACT

Hydrogel particles are produced by a drying step followed sequentially by precomminuting, grinding, separating, and further drying of coarse particles.

7 Claims, No Drawings

COMPLETE DRYING METHOD FOR HYDROGELS

The present invention relates to a process for completely drying hydrogels possessing a substantially improved drying efficiency compared to the prior art.

Gels are materials whose state is between that of a solid and of a liquid. Gels consist of polymeric, i.e. long chain, molecules linked together to form a three-dimensional network and embedded in a liquid medium. In the case of hydrogels, the liquid medium is water. The polymer backbone of hydrogels is formed by hydrophilic monomer units and may be neutral or ionic. Examples of neutral and hydrophilic monomer units are ethylene oxide, vinyl alcohol, (meth)acrylamide, N-alkylated (meth)acrylamides, N-methylol(meth)acrylamide, N-vinylamides, N-vinylformamide, N-vinylacetamide, N-vinyl-N-methylacetamide, N-vinyl-N-methylformamide, hydroxyalkyl (meth)acrylates such as hydroxyethylmethacrylate, vinylpyrrolidone, (meth)acrylic esters of polyethylene glycol monoallyl ethers, allyl ethers, of polyethylene glycols, sugar units such as glucose or galactose. Examples of cationic hydrophilic monomer units are ethyleneimine (in the protonated form), diallyldimethylammonium chloride and trimethylammonium propylmethacrylamide chloride. Examples of anionic monomer units are (meth)acrylic acid, crotonic acid, maleic acid, fumaric acid, itaconic acid, 2-acrylamido-2-methylpropanesulfonic acid, vinylsulfonic acid, vinylphosphonic acid, 2-methacryloyloxyethanesulfonic acid, 4-vinylbenzenesulfonic acid, allylsulfonic acid, vinyltoluenesulfonic acid and vinylbenzenephosphonic acid (every one of the recited compounds in the deprotonated form).

Hydrogels obtainable by polymerization of unsaturated acids, for example acrylic acid, methacrylic acid and acrylamidopropanesulfonic acid, in the presence of small amounts of multiply olefinically unsaturated compounds are already known as superabsorbent polymers and described for example in U.S. Pat. No. 4,057,521, U.S. Pat. No. 4,062,817, U.S. Pat. No. 4,525,527, U.S. Pat. No. 4,286,082, U.S. Pat. No. 4,340,706 and U.S. Pat. No. 4,295,987.

Hydrogels are also obtainable by graft copolymerization of olefinically unsaturated acids onto different matrices, for example polysaccharides, polyalkylene oxides and also derivatives thereof. Such graft copolymers are known for example from U.S. Pat. No. 5,011,892, U.S. Pat. No. 4,076,663 and U.S. Pat. No. 4,931,497.

The abovementioned hydrogels are notable for high absorbency for water and aqueous solutions and are therefore preferably used, in dried, ground and classified form, as absorbents in hygiene articles. The particle size distribution of the hydrogels here is in the range from 0 to 2000 $\mu$m, preferably from 100 to 1000 $\mu$m.

Hydrogels are generally dried, following their comminution, using known contact or convective drying processes. Examples of contact dryers are hotplate, thin film, can, contact belt, sieve drum, screw, tumble or contact disk dryers. Examples of convection dryers are tray, chamber, channel, flat web, plate, rotary drum, free fall shaft, sieve belt, stream, atomization, fluidized bed, moving bed, paddle or spherical bed dryers (Kirk-othmer 7, 326–398; (3rd) 1, 598–624; 8, 75–130, 311–339; 5, 104–112; Ullmann 1, 529–609; 11, 642 ff.; (4th) 2, 698–721; vt Industrielle Praxis: "Fortschritte auf dem Gebiet der Einbandtrockner, Teil 1: Auslegungsverfahren, E. Tittmann; Research Disclosure 96-38363: "Drying of Pasty Materials using a Continuous Through-Circulation Belt Dryer"). A feature common to all these drying processes is that complete drying of all hydrogel particles takes place only under conditions where the majority of the hydrogel particles has already been overdried. But these drying conditions represent an uneconomical utilization of dryer capacity. However, when dryer capacity utilization economics are optimized, drying conditions will be such that the majority of the hydrogel particles are already dry while a small portion of the hydrogel particles is still moist in that the hydrogel particles have a residual moisture content of >10% by weight. In what follows, hydrogel particles having a water content of greater than 10% by weight are referred to as moist hydrogel particles. Moist hydrogel particles possess rubbery elasticity and tend to stick together, so that they lead to appreciable upsets in the subsequent grinding and sieving process for the dried material. Drying conditions are therefore chosen in commercial practice to represent a compromise between dryer capacity utilization and processability of the dried material.

It is an object of the present invention to provide a process for drying hydrogels which creates an efficiently dried material while maximizing the utilization of dryer capacity.

We have found that this object is achieved by a process for drying a hydrogel, which comprises the following successive steps:

a) drying said hydrogel by contact or convective drying b) precomminuting the contact or convectively dried hydrogel c) grinding the precomminuted hydrogel using a coarse or breaker roll mill d) separating off the moist resilient hydrogel particles which have a water content of more than 10% by weight e) afterdrying said moist resilient hydrogel particles.

The process of the invention will now be more particularly described.

The hydrogel is dried according to a commonly known contact or convective drying process. The type of drying process is not critical, but preference is given to can drying and sieve belt drying where perforated trays of a circular conveyor are loaded in a tunnel with material to be dried and the material to be dried is dried by blowing hot air through the tray holes in the course of passage through the tunnel. The drying conditions here are preferably chosen so that the fraction of dried material having a residual moisture content of more than 10% by weight is in the range from 5 to 40%, preferably in the range from 10 to 30%, of the total dried material. These drying conditions provide economically advantageous utilization of the drying capacity. However, owing to the fraction of moist, rubberily elastic hydrogel particles it contains, the dried material cannot be sent directly for further working up, i.e. sieving and grinding. It is therefore necessary to separate the moist, resilient hydrogel particles from the brittle, dry, hydrogel particles prior to grinding. It has been found that, surprisingly, such a separation is provided by a combination of the steps of precomminution, grinding with a coarse or crusher roll mill and sieving. In this sequence, the dried material is initially precomminuted to a median particle size of from 5 to 50 mm. Suitable apparatuses for this precomminution are knuckle-type crushers, cutting mills or shredders, the use of a knuckle-type crusher being particularly preferred. The thus precomminuted hydrogel is fed into a coarse or breaker roll mill. The nip is adjusted so that the dry, brittle hydrogel particles are broken to a median particle size of 0.1–10 mm, preferably 0.3–10 mm, while the moist, rubberily elastic hydrogel particles are merely deformed but not broken under these conditions. The larger, moist hydrogel particles are separated from the dry, comminuted hydrogel particles by sieving, preferably using a vibrating sieve having a hole diameter of from 8 to 12 mm. The vibrating frequency is in the range from 10 to 50 Hz, preferably from 20 to 30 Hz. The amplitude of vibration is in the range from 1 to 10 mm, preferably from 2 to 5 mm, and the inclination with regard to the horizontal is in the range from 5 to 45°, preferably from 5 to 25°.

The dry, comminuted hydrogel particles pass through the sieve and may directly be sent for further working up such as grinding and sieving to adjust the particle size distribution. The removed moist, large hydrogel particles are either returned back into the stream of hydrogel to be dried or are sent into a separate afterdrying stage. Particular preference is given to the separate afterdrying in suitable drying apparatuses such as, for example, disk or paddle dryers. The afterdried hydrogel particles can then be returned into the drying stream for precomminution.

The process of the invention provides complete drying of hydrogels with substantially improved utilization of dryer capacity compared to the prior art. This makes the entire production process more productive, which in turn leads to lower production costs.

EXAMPLES

Inventive Example 1

A hydrogel consisting of 65% by weight of water and 35% by weight of a crosslinked polyacrylic acid having a degree of neutralization of 74 mol % was comminuted in an extruder and subjected to sieve belt drying. Drying took place at an air temperature of 180° C. and an air velocity of 2 m/s. In the last chamber of the sieve belt dryer, the dried material was cooled to a temperature of less than 60° C. The residence time of the hydrogel in the sieve belt drying stage was 30 minutes, and dryer capacity under these conditions was 2200 kg of hydrogel/h. The cooled dry material was precomminuted by means of a knuckle-type crusher to a median particle size of 5 mm. The precomminuted hydrogel was then introduced into a coarse roll mill having a nip setting of 1.5 mm. This was followed by sieving through a vibrating sieve having a hole size of 10 mm. The sieve retained 25% of the product as moist, large hydrogel particles, while letting the remaining 75% pass as dry, small hydrogel particles. The dry hydrogel particles were ground by means of a two-stage roll mill and classified to a particle size of 120–850 μm. The moist, large hydrogel particles were completely dried in a paddle dryer and then returned into the knuckle-type crusher for precomminution.

Comparative Example 1

Inventive Example 1 was repeated except that the moist hydrogel particles were not separated off; instead the entire product stream was directly subjected to the two-stage grinding following precomminution. The run had to be discontinued after 5 minutes, since the rolls of the two-stage roll mill became stuck together by the moist hydrogel particles.

Comparative Example 2

Inventive Example 1 was repeated except that the residence time of the hydrogel at the sieve belt drying stage was varied. The fraction of moist hydrogel particles was determined and an attempt was made to grind the hydrogel without separating off these moist hydrogel particles.

| Residence time | Dryer capacity | Fraction of moist hydrogel particles | Successful grinding without removal of moist hydrogel particles |
| --- | --- | --- | --- |
| 40 min | 1650 kg/h | 18% | not possible |
| 50 min | 1320 kg/h | 12% | not possible |
| 60 min | 1100 kg/h | 6% | not possible |
| 80 min | 825 kg/h | 1.5% | possible |
| 100 min | 660 kg/h | 0.5% | possible |

Successful grinding of the dried material without removal of the moist hydrogel particles is thus only possible with a substantially reduced dryer capacity.

We claim:

1. A process for drying a hydrogel, which comprises the following successive steps:

a) drying said hydrogel by contact or convective drying b) precomminuting the contact or convectively dried hydrogel c) grinding the precomminuted hydrogel using a coarse or crusher roll mill d) separating off the moist resilient hydrogel particles which have a water content of more than 10% by weight e) afterdrying said moist resilient hydrogel particles.

2. A process as claimed in claim 1, wherein said drying of said hydrogel is effected using a can dryer or a belt dryer.

3. A process as claimed in claim 1, wherein said precomminuting of the dried material is effected using a knuckle-type crusher.

4. A process as claimed in claim 1, wherein said grinding of the precomminuted dried material using a coarse or crusher roll mill is effected using a nip setting such that the dry particles have an average diameter of 0.1–10 mm after grinding.

5. A process as claimed in claim 1, wherein the moist resilient particles are separated off using a sieve vibrating at a frequency of 10 to 50 Hz to an amplitude of 1–10 mm and at an inclination of from 5 to 45° with regard to the horizontal.

6. A process as claimed in claim 1, wherein the moist particles which have been separated off are added to the hydrogel to be dried.

7. A process as claimed in claim 1, wherein the moist particles separated off are directed into a separate dryer for afterdrying.

* * * * *